(12) United States Patent
Zhu et al.

(10) Patent No.: US 11,265,405 B2
(45) Date of Patent: Mar. 1, 2022

(54) MOBILE TERMINAL

(71) Applicant: VIVO MOBILE COMMUNICATION CO., LTD., Chang'an Dongguan (CN)

(72) Inventors: Huasheng Zhu, Chang'an Dongguan (CN); Heng Zhang, Chang'an Dongguan (CN); Yanchang Zheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/186,888

(22) Filed: Feb. 26, 2021

(65) Prior Publication Data

US 2021/0185156 A1   Jun. 17, 2021

Related U.S. Application Data

(63) Continuation of application No. PCT/CN2019/099236, filed on Aug. 5, 2019.

(30) Foreign Application Priority Data

Aug. 30, 2018 (CN) .......................... 201811008751.2

(51) Int. Cl.
*H04M 1/02* (2006.01)

(52) U.S. Cl.
CPC ................. *H04M 1/0264* (2013.01)

(58) Field of Classification Search
CPC . H04M 1/0264; H04N 5/2257; H04N 5/2254; H04N 5/232
See application file for complete search history.

(56) References Cited

U.S. PATENT DOCUMENTS

| 8,928,801 B2* | 1/2015 | Sun | G02B 7/08 |
| | | | 348/360 |
| 2014/0016971 A1* | 1/2014 | Arai | G03G 15/2053 |
| | | | 399/329 |
| 2019/0166236 A1* | 5/2019 | Zeng | H04M 1/0237 |

FOREIGN PATENT DOCUMENTS

| CN | 107707698 A | 2/2018 |
| CN | 207491002 U | 6/2018 |
| CN | 207491003 U | 6/2018 |
| CN | 108259728 A | 7/2018 |
| CN | 109005263 A | 12/2018 |
| CN | 109005264 A | 12/2018 |
| CN | 109088962 A | 12/2018 |
| CN | 109120755 A | 1/2019 |
| WO | 2006011610 A1 | 2/2006 |

OTHER PUBLICATIONS

International Search Report & Written Opinion related to Application No. PCT/CN2019/099236; dated Mar. 11, 2021.

* cited by examiner

*Primary Examiner* — Lester G Kincaid
*Assistant Examiner* — Maryam Soltanzadeh
(74) *Attorney, Agent, or Firm* — von Briesen & Roper, s.c.

(57) ABSTRACT

A mobile terminal is provided, including a housing, a camera, and a drive structure disposed in the housing, and a frame of the housing is provided with a hole; and the drive structure includes a drive body, a gear group, and a guiding rack fixed in the housing, the camera is rotatably disposed on the housing and is connected to the drive body, and the drive body cooperates with the guiding rack through rotation by using the gear group, and drives the camera to rotatably enter and leave the hole.

8 Claims, 8 Drawing Sheets

MOBILE TERMINAL

CROSS REFERENCE TO RELATED APPLICATIONS

This application is a continuation application of International Application No. PCT/CN2019/099236 filed on Aug. 5, 2019, which claims priority to Chinese Patent Application No. 201811008751.2 filed on Aug. 30, 2018 in China, both disclosures of which are incorporated herein by reference in their entireties.

TECHNICAL FIELD

The present disclosure relates to the technical field of mobile terminal design, and in particular, to a mobile terminal.

BACKGROUND

With the diversification of user demands, more and more mobile terminals such as mobile phones and tablet computers enter people's lives. At present, mobile terminals have more and more functions. Mobile terminals usually have a photographing function, to meet the photographing demands of users. The photographing function of a mobile terminal is usually performed by a camera module of the mobile terminal. A camera of the camera module is usually disposed on a frame on the outer side of the display screen on the top of the mobile terminal.

At present, the frame on the top of the mobile terminal is relatively wide, to provide sufficient space to dispose the camera. With the continuous improvement of user requirements, the performance of mobile terminals is increasingly optimized. The prominent demonstration is that the screen-to-body ratio of current mobile terminals is more and more large, and even full-screen mobile terminals appear. Provided that an overall size of a mobile terminal is determined, an area occupied by the display screen becomes larger and larger and the frame becomes narrower and narrower. As a result, the frame does not have sufficient space to dispose the camera.

To ensure the disposing of the camera and increase the screen-to-body ratio of the mobile terminal as much as possible, the display screen of the current mobile terminal is perforated to dispose the camera. Disposing the camera on the display screen affects the display effect of the mobile terminal and the user's usage experience. Worse still, the camera still occupies the disposing area of the display screen, and still affects the development of the mobile terminal towards a large screen-to-body ratio.

SUMMARY

A mobile terminal includes a housing, a camera, and a drive structure disposed in the housing. A frame of the housing is provided with a hole. The drive structure includes a drive body, a gear group, and a guiding rack fixed in the housing. The camera is rotatably disposed on the housing and is connected to the drive body. The drive body cooperates with the guiding rack through rotation by using the gear group, and drives the camera to rotatably enter and leave the hole.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings.

DESCRIPTION OF REFERENCE NUMERALS

100—housing, 110—frame, 111—hole, 200—camera, 210—box, 211—box body, 211a—first mounting groove, 211b—second mounting groove, 212—camera lens, 213—pressure plate, 220—camera body, 300—drive structure, 310—drive body, 320—gear group, 321—first tapered gear, 322—second tapered gear, 323—third gear, 324—first rotating shaft, 330—guiding rack, 340—decelerator, and 400—second rotating shaft.

DESCRIPTION OF EMBODIMENTS

To make the objectives, technical solutions, and advantages of the present disclosure clearer, the following clearly describes the technical solutions of the present disclosure with reference to specific embodiments and corresponding accompanying drawings of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes, in detail with reference to the accompanying drawings, the technical solutions disclosed by various embodiments of the present disclosure.

Figure 1:
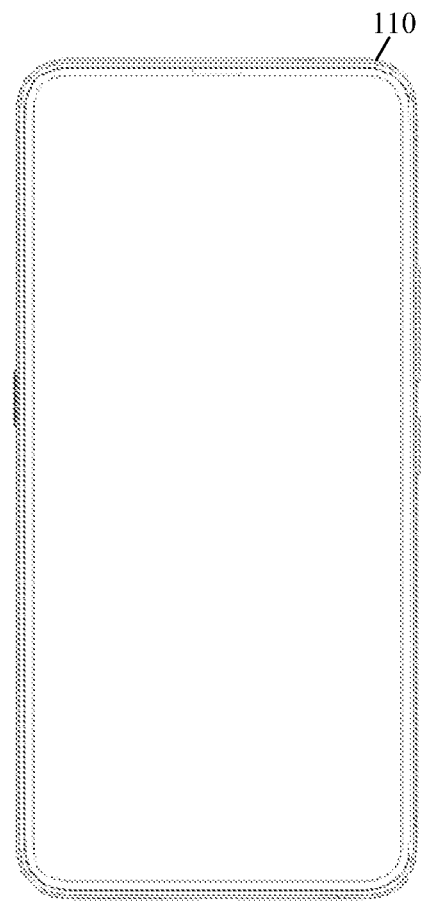
FIG. 1 and FIG. 2 are schematic diagrams of a mobile terminal in a state and at different angles of view according to some embodiments of the present disclosure.
Figure 2:
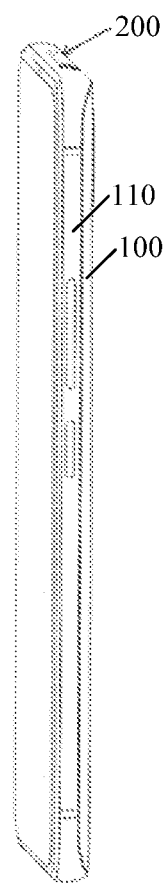
Figure 3:
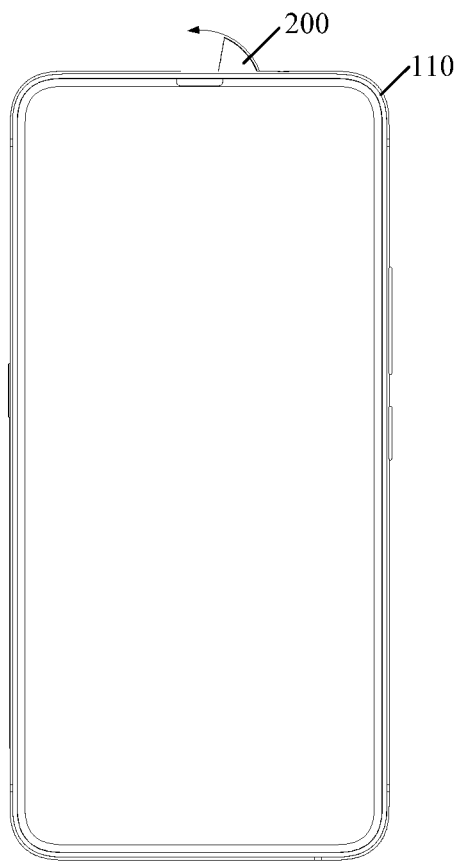
FIG. 3 is a schematic diagram of a process of rotating a camera out of a mobile terminal according to some embodiments of the present disclosure.
Figure 4:
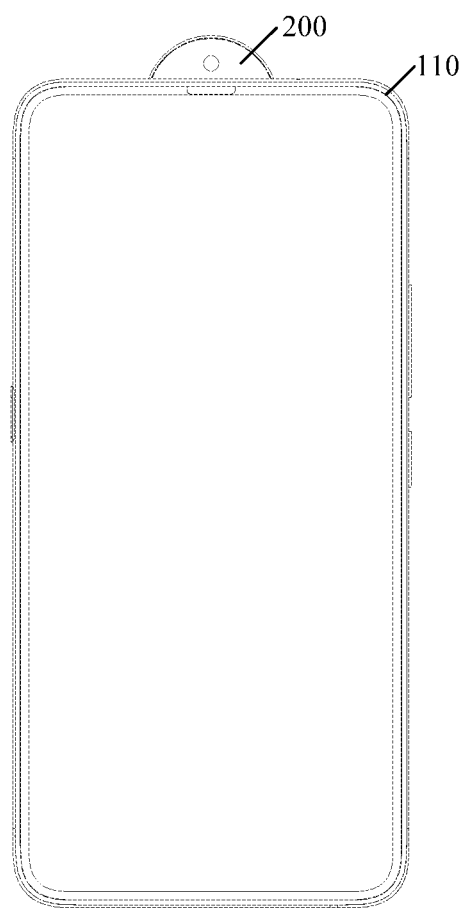
FIG. 4 and FIG. 5 are schematic diagrams of a mobile terminal in another state and at different angles of view according to some embodiments of the present disclosure.
Figure 5:
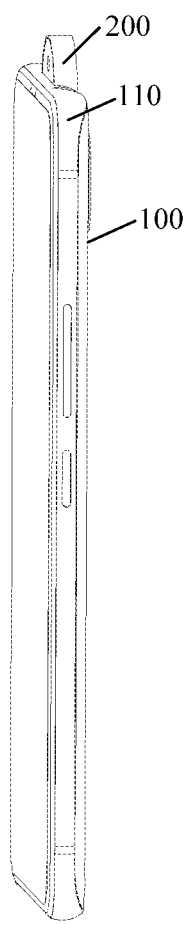
Figure 6:
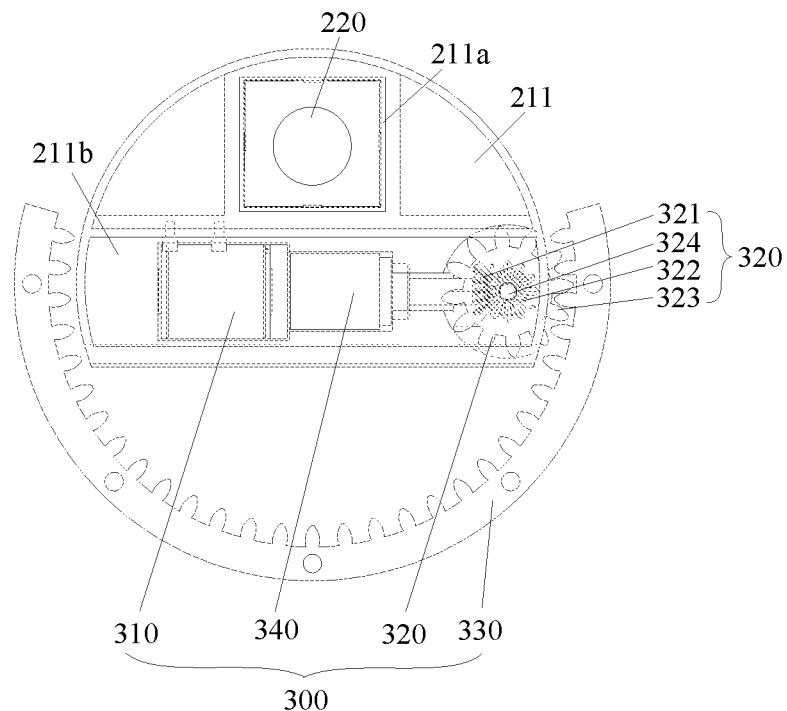
FIG. 6 is a schematic diagram of assembling some structures of the camera and a drive structure.
Figure 7:
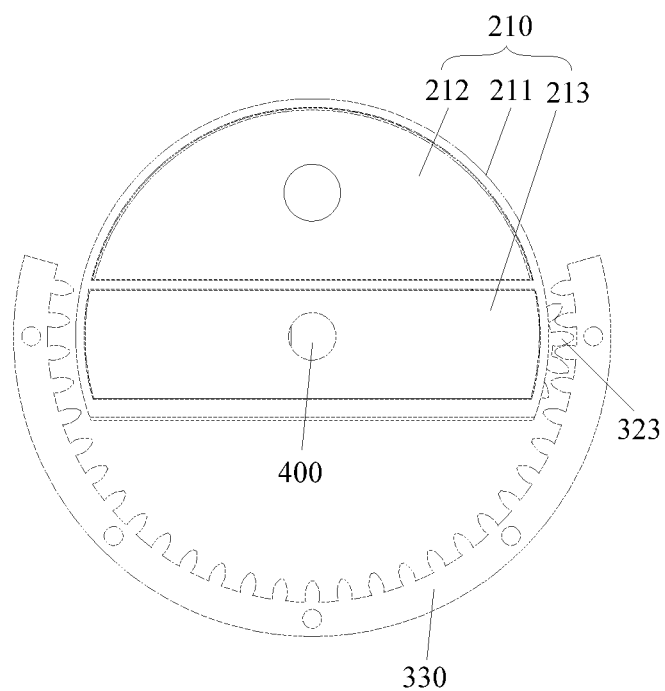
FIG. 7 is a schematic diagram of assembling a camera and a drive structure.
Figure 8:
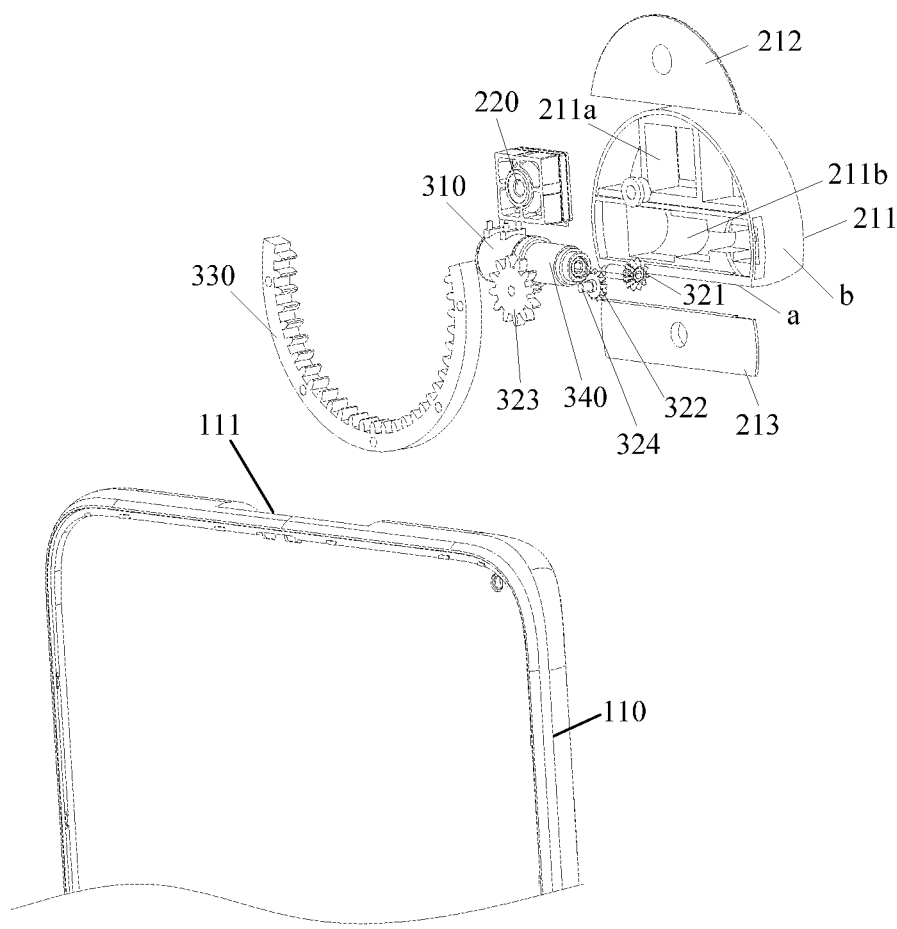
FIG. 8 is a schematic exploded diagram of some structures of a mobile terminal according to some embodiments of this disclosure.
Figure 9:
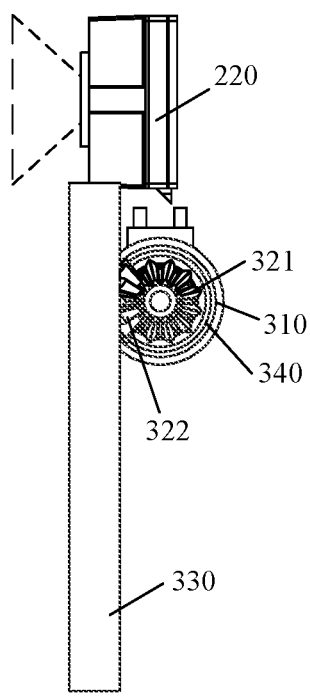
FIG. 9 is a schematic structural diagram of a part of a mobile terminal according to some embodiments of this disclosure.

Referring to FIG. 1 to FIG. 9, some embodiments of the present disclosure disclose a mobile terminal. The disclosed mobile terminal includes a housing 100, a camera 200, and a drive structure 300.

The housing 100 is a supporting component of the mobile terminal, and serves as the basis and protection for mounting other components of the mobile terminal. The housing 100 has a frame 110 and a cavity, the frame 110 has a hole 111, and the hole 111 is in communication with the cavity.

The drive structure 300 is disposed in the housing 100, that is, located in the cavity of the housing 100. The camera 200 is rotatably disposed on the housing 100, and the camera 200 may rotate to enter and leave the hole 111.

The drive structure 300 includes a drive body 310, a gear group 320, and a guiding rack 330 fixed in the housing 100.

The guiding rack 330 may be an arc rack. Specifically, the guiding rack 330 may be fixed in the housing 100 by using a screw. The camera 200 is connected to the drive body 310. The drive body 310 cooperates with the guiding rack 330 through rotation by using the gear group 320, and drives the camera 200 to rotatably enter and leave the hole 111, so that the camera 200 moves into or moves out of the mobile terminal.

The drive body 310 meshes with the guiding rack 330 through the gear group 320. In a process of meshing cooperation, because the guiding rack 330 is fixed in the housing 100, this is equivalent to that the drive body 310 meshes with the guiding rack 330 through the gear group 320, to rotate relative to the guiding rack 330. Because the drive body 310 is connected to the camera 200, rotation of the drive body 310 drives the camera 200 to rotate, so that the camera 200 rotates out of the mobile terminal through the hole 111, to prepare for photographing. After photographing is finished, the drive body 310 is controlled, so that the gear group 320 meshes with the guiding rack 330 and moves in an opposite direction, so that the camera 200 is driven to pass through the hole 111 and rotate back into the housing 100 from outside the mobile terminal.

As can be seen from the foregoing working process, in the mobile terminal disclosed in some embodiments of the present disclosure, the camera 200 is connected to the drive body 310, and the gear group 320 meshes with the guiding rack 330, so that the drive body 310 rotates relative to the guiding rack 330 and finally drives the camera 200 to rotate to enter and leave the hole 111. In this process, the location of the camera 200 is changed (moves from inside the housing 100 to outside the housing 100 and moves from outside the housing 100 to inside the housing 100) so that the camera works. Obviously, in the mobile terminal disclosed in the embodiments, disposing of the camera 200 does not occupy the area for disposing the display screen on the mobile terminal while the photographing function of the mobile terminal is ensured. Therefore, this does not limit further increase of the screen-to-body ratio of the mobile terminal. As can be seen, the mobile terminal disclosed in some embodiments of the present disclosure can resolve the problem that disposing of a camera affects the development of mobile terminals towards a large screen-to-body ratio in the related art.

To achieve a better transmission effect, specifically, the camera 200 is fixedly connected to the drive body 310. Specifically, the camera 200 may include a box 210 and a camera body 220. The camera body 220 is a photographing part of the camera 200, the camera body 220 is disposed in the box 210, and the box 210 may be considered as a housing of the camera 200 and serves to protect the camera body 220. Certainly, the box 210 should not affect photographing of the camera body 220. A photographing window may be disposed on the box 210, and the photographing window may be a hole or may be a transparent window such as a glass window.

The box 210 is fixedly connected to the drive body 310. In this case, the box 210 may further serve as the basis for mounting the drive body 310.

In this embodiment, the box 210 may include a box body 211 and a camera lens 212, the box body 211 may have a first mounting groove 211a, the camera lens 212 is fixed in an opening of the first mounting groove 211a, and the camera lens 212 and the first mounting groove 211a form a first accommodation space. The camera body 220 is disposed in the first accommodation space. Specifically, the camera body 220 may be fixed in the first accommodation space through bonding, a connecting piece (for example, a thread connecting piece), or a connecting structure (for example, a fastening structure). The camera lens 212 is disposed opposite to a lens of the camera body 220, so that the lens may photograph scenery. The camera lens 212 may be considered as the foregoing photographing window.

Usually, the camera lens 212 is made of a brittle transparent material such as glass, and is fixed on the box 211 through a connecting piece or a connecting structure. The camera lens 212 is easily damaged, for example, is smashed. On this basis, in an optional solution, the camera lens 212 may be fixed in the opening of the first mounting groove 211a through bonding. Specifically, the camera lens 212 may be bonded in the opening of the first mounting groove 211a through a double-sided tape or a glue dispensing layer.

In an optional solution, the box body 211 may have a second mounting groove 211b, the box 210 may further include a pressure plate 213, the pressure plate 213 is fixed in an opening of the second mounting groove 211b, and the pressure plate 213 and the second mounting groove 211b form a second accommodation space. The drive body 310 may be mounted in the second accommodation space, and the gear group 320 partially passes through the box 210 and cooperates with the guiding rack 330 through rotation. A box body 211 is usually provided with an escape hole, and a part of structure of the gear group 320 may pass through the escape hole, to mesh and cooperate with the guiding rack 330. In this solution, the drive body 310 is disposed in the second accommodation space, and may be further protected by the box 210 while normal working of the drive body 310 is not affected.

The box 210 has a plurality of types of structures and serves as a peripheral component of the camera 200, as long as the box 210 may rotatably enter and leave the hole 111 driven by the drive body 310. To better adapt to rotation and further reduce space occupied in the housing 100, in an optional solution, a surface between two ends of the box 210 is an outer circumferential surface, the outer circumferential surface may include a straight segment a and a bent segment b connected to the straight segment a, the bent segment b is located on a same cylindrical surface, and the bent segment b may enter and leave the hole 111 along with the camera 200. The box 210 of this structure undoubtedly can desirably adapt to space enclosed by the guiding rack 330, to reduce overall space occupied by the camera 200 and the drive body 310.

It should be noted that two end faces of the box 210 that separately face and is away from a photographing direction may be considered as a front end face and a rear end face, and a side wall surface between the front end face and the rear end face may be considered as the outer circumferential surface.

Specifically, the straight segment a may block the hole 111 when the camera 200 returns to the housing 100 from the hole 111, so that the camera 200 returns to the housing 100. In addition, the hole 111 is blocked, thereby achieving a good dustproof effect.

The gear group 320 has a plurality of types of structures, and the gear group 320 functions for transmission connection. Still referring to FIG. 6 to FIG. 9, in a specific implementation, the gear group 320 may include a first tapered gear 321, a second tapered gear 322, a third gear 323, and a first rotating shaft 324. The first tapered gear 321 is connected to the drive body 310 through rotation, the second tapered gear 322 meshes with the first tapered gear 321, the third gear 323 and the second tapered gear 322 are both fixed on the first rotating shaft 324, and the first rotating shaft 324 is rotatably disposed on the camera 200. The first tapered gear 321 and the second tapered gear 322 are used, so that a torque transmission direction may change. In this way, the drive structure 300 is disposed more flexibly, and this helps fully utilize space in the housing 100 for adaptive disposing.

In an optional solution, the second rotating shaft 400 may be disposed on the housing 100, and the camera 200 is fixed on the second rotating shaft 400 and therefore may rotate relative to the housing 100 along with the second rotating shaft 400. As is known, the camera 200 and the drive structure 300 both require a power supply in a working process. To facilitate cabling, in an optional solution, the second rotating shaft 400 may be a hollow shaft, and a power supply line electrically connected to the camera 200 and the drive body 310 may pass through the second rotating shaft 400, and is electrically connected to a circuit board of the mobile terminal. This disposing direction is equivalent to disposing the power supply line on a rotational axis of the camera 200. This undoubtedly can alleviate the problem that the power supply line intertwines because of rotation.

In some embodiments of the present disclosure, the drive body 310 is usually a drive motor. To better control the rotation speed of the camera 200, the drive body 310 is usually connected to the gear group 320 through rotation by using a decelerator 340. In the optional solution, the drive body 310 may be a stepper motor, and the stepper motor can undoubtedly improve driving accuracy.

The mobile terminal disclosed in some embodiments of the present disclosure may be a mobile phone, a tablet computer, an e-book reader, a wearable device, and other devices with a camera and a display screen. Some embodiments of the present disclosure do not limit a specific type of the mobile terminal.

In the foregoing embodiments of the present disclosure, differences between the various embodiments are mainly described. Different optimized features of the various embodiments may be combined to form better embodiments as long as there is no conflict. Details are not repeated herein for brevity of the text.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

The invention claimed is:

1. A mobile terminal, comprising a housing, a camera, and a drive structure disposed in the housing,
wherein a hole is formed in a frame of the housing; and
the drive structure comprises a drive body, a gear group; and a guiding rack fixed in the housing, the camera is rotatably disposed on the housing and is connected to the drive body, and the drive body cooperates with the guiding rack through rotation by using the gear group, and drives the camera to rotatably enter and exit the hole;
wherein the camera comprises a box and a camera body disposed in the box, and the box is fixedly connected to the drive body;
wherein the box comprises a box body, the box body has a second mounting groove, the box further comprises a pressure plate, the pressure plate is fixed in an opening of the second mounting groove, the pressure plate and the second mounting groove form a second accommodation space, the drive body is mounted in the second accommodation space, the box body is provided with an escape hole, and a part of structure of the gear group passes through the escape hole, to mesh and cooperate with the guiding rack.

2. The mobile terminal according to claim 1, wherein the box further comprises a camera lens, the box body has a first mounting groove, the camera lens is fixed in an opening of the first mounting groove, the camera lens and the first mounting groove form a first accommodation space, the camera body is disposed in the first accommodation space, and the camera lens is disposed opposite to a lens of the camera body.

3. The mobile terminal according to claim 2, wherein the camera lens is fixed in the opening of the first mounting groove through bonding.

4. The mobile terminal according to claim 1, wherein a surface between two ends of the box is an outer circumferential surface, the outer circumferential surface comprises a straight segment and a bent segment connected to the straight segment, the bent segment is located on a same cylindrical surface, and the bent segment may enter and leave the hole along with the camera.

5. The mobile terminal according to claim 4, wherein the straight segment may block the hole when the camera returns to the housing from the hole.

6. The mobile terminal according to claim 1, wherein the gear group comprises a first tapered gear, a second tapered gear, a third gear and a first rotating shaft, the first tapered gear is connected to the drive body through rotation, the second tapered gear meshes with the first tapered gear, the third gear and the second tapered gear are both fixed on the first rotating shaft, and the first rotating shaft is rotatably disposed on the camera.

7. The mobile terminal according to claim 1, wherein a second rotating shaft is disposed on the housing, the camera is fixed on the second rotating shaft, the second rotating shaft is a hollow shaft, and a power supply line electrically connected to the camera and the drive body passes through the second rotating shaft, and is electrically connected to a circuit board of the mobile terminal.

8. The mobile terminal according to claim 1, wherein the drive body is connected to the gear group through transmission by using a decelerator, and the drive body is a stepper motor.

* * * * *